(12) United States Patent
Zhang

(10) Patent No.: US 12,185,217 B2
(45) Date of Patent: Dec. 31, 2024

(54) RELAY SELECTION METHOD AND DEVICE FOR SIDELINK, STORAGE MEDIUM AND TERMINAL

(71) Applicant: SPREADTRUM COMMUNICATIONS (SHANGHAI) CO., LTD., Shanghai (CN)

(72) Inventor: Meng Zhang, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 382 days.

(21) Appl. No.: 17/635,564

(22) PCT Filed: Aug. 10, 2020

(86) PCT No.: PCT/CN2020/108108
§ 371 (c)(1),
(2) Date: Feb. 15, 2022

(87) PCT Pub. No.: WO2021/031896
PCT Pub. Date: Feb. 25, 2021

(65) Prior Publication Data
US 2022/0303866 A1    Sep. 22, 2022

(30) Foreign Application Priority Data
Aug. 16, 2019   (CN) .......................... 201910759360.2

(51) Int. Cl.
*H04W 40/22* (2009.01)
*H04W 88/04* (2009.01)

(52) U.S. Cl.
CPC ............ *H04W 40/22* (2013.01); *H04W 88/04* (2013.01)

(58) Field of Classification Search
CPC .............................. H04W 40/22; H04W 88/04
(Continued)

(56) References Cited

U.S. PATENT DOCUMENTS

| 2008/0027923 | A1* | 1/2008 | George ................ G06F 16/148 |
| 2011/0256828 | A1* | 10/2011 | Hsu ...................... H04W 76/10 |
| | | | 455/13.1 |

(Continued)

FOREIGN PATENT DOCUMENTS

| CN | 105430633 A | 3/2016 |
| CN | 105451282 A | 3/2016 |

(Continued)

OTHER PUBLICATIONS

International Search Report for International Application No. PCT/CN2020/108108; Date of Mailing, Nov. 2, 2020.

(Continued)

*Primary Examiner* — Michael Y Mapa
(74) *Attorney, Agent, or Firm* — CANTOR COLBURN LLP

(57) ABSTRACT

A relay selection method and device for a sidelink, a storage medium and a terminal are provided. The sidelink is a communication link between a first terminal and a second terminal, and the method includes: receiving a first message, wherein the first message includes a first candidate relay set including at least one first candidate relay, quality of a first link between the first terminal and the at least one first candidate relay reaches a preset threshold; selecting a preferred relay from the first candidate relay set based on quality of a second link between the second terminal and the at least one first candidate relay in the first candidate relay set; and determining the preferred relay as a relay of the first terminal and the second terminal on the sidelink.

14 Claims, 4 Drawing Sheets

(58) Field of Classification Search
USPC .......................... 370/315; 455/7, 450–452.2
See application file for complete search history.

(56) References Cited

U.S. PATENT DOCUMENTS

| | | | |
|---|---|---|---|
| 2012/0250545 A1* | 10/2012 | Papadogiannis | H04W 40/12 370/252 |
| 2014/0078952 A1* | 3/2014 | Bontu | H04W 76/14 370/312 |
| 2016/0337954 A1 | 11/2016 | Gulati et al. | |
| 2017/0027009 A1* | 1/2017 | Dumpala | H04W 76/14 |
| 2017/0244468 A1 | 8/2017 | Zhao | |
| 2017/0359766 A1* | 12/2017 | Agiwal | H04L 5/0048 |
| 2018/0084442 A1 | 3/2018 | Lee et al. | |
| 2018/0220480 A1* | 8/2018 | Agiwal | H04W 76/14 |
| 2018/0242381 A1 | 8/2018 | Wei et al. | |
| 2019/0132784 A1 | 5/2019 | Thubert et al. | |
| 2020/0404571 A1 | 12/2020 | Lin et al. | |

FOREIGN PATENT DOCUMENTS

| | | |
|---|---|---|
| CN | 106572514 A | 4/2017 |
| CN | 108141900 A | 6/2018 |
| CN | 108809897 A | 11/2018 |
| CN | 110461020 A | 11/2019 |
| EP | 3618391 A1 | 3/2020 |
| WO | 2019154074 A1 | 8/2019 |

OTHER PUBLICATIONS

CNIPA First Office Action for corresponding CN Application No. 201910759360.2; Issued on Apr. 6, 2021.

* cited by examiner

RELAY SELECTION METHOD AND DEVICE FOR SIDELINK, STORAGE MEDIUM AND TERMINAL

CROSS-REFERENCE TO RELATED APPLICATIONS

This is a U.S. national stage of application No. PCT/CN2020/108108, filed on Aug. 10, 2020. Priority under 35 U.S.C. § 119(a) and 35 U.S.C. § 365(b) is claimed from Chinese Application No. 201910759360.2, filed Aug. 16, 2019, the disclosure of which is also incorporated herein by reference.

TECHNICAL FIELD

The present disclosure generally relates to communication technology field, and more particularly, to a relay selection method and devicefor a sidelink, a storage medium and a terminal.

BACKGROUND

Study of Device-to-Device (D2D) in Release 12 (R12) to R15 mainly focuses on types of User Equipment-to-network relay (UE-to-network relay). The relay communicates with a base station and a remote UE respectively, so as to set up a communication bridge between the base station and the remote UE.

In future Internet of Vehicles or other similar or relevant application scenarios, due to a limited communication distance or limited channel quality, a UE-to-UE relay can be introduced into communication between vehicles. The relay enables two UEs to communicate normally even if the communication distance is limited or the channel quality is limited.

SUMMARY

Embodiments of the present disclosure provide relay selection logic suitable for UE-to-UE relay scenarios to ensure that two UEs that are communication peers in a sidelink can communicate with each other normally even when a communication distance is limited or channel quality is limited.

In an embodiment of the present disclosure, a relay selection method for a sidelink is provided, wherein the sidelink is a communication link between a first terminal and a second terminal, and the method includes: receiving a first message, wherein the first message includes a first candidate relay set including at least one first candidate relay, quality of a first link between the first terminal and the at least one first candidate relay reaches a preset threshold; selecting a preferred relay from the first candidate relay set based on quality of a second link between the second terminal and the at least one first candidate relay in the first candidate relay set; and determining the preferred relay as a relay of the first terminal and the second terminal on the sidelink.

In an embodiment of the present disclosure, a storage medium having computer instructions stored therein is provided, wherein when the computer instructions are executed, the above method is performed.

In an embodiment of the present disclosure, a terminal including a memory and a processor is provided, wherein the memory has computer instructions stored therein, and when the processor executes the computer instructions, the above method is performed.

DETAILED DESCRIPTION

Figure 1:
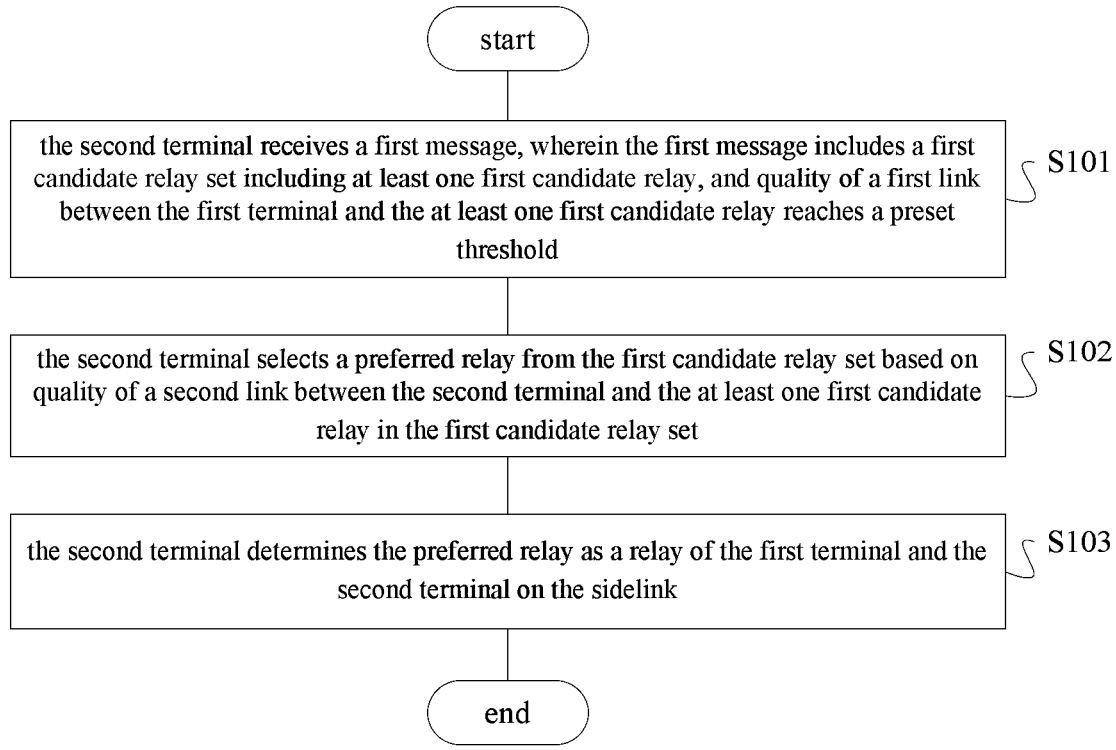
FIG. 1 is a flow chart of a relay selection method for a sidelink according to an embodiment.

As described in the background, relevant description of selection and reselection in UE-network relay scenarios may be referred to the standard 36.331.

Specifically, if an RSRP of a Uu link between a UE and a base station is lower than a threshold, and the UE has not selected any sidelink relay UE, the UE selects a candidate sidelink relay UE, where a measured Sidelink Discovery Reference Signal Received Power (SD-RSRP) corresponding to the candidate sidelink relay UE is higher than the threshold.

If the UE has selected a sidelink relay UE whose corresponding measured SD-RSRP is lower than the threshold, the UE should select a candidate sidelink relay UE whose corresponding measured SD-RSRP is higher than the threshold.

If the UE does not detect any sidelink relay UE that meets requirements, the UE considers that there is no available sidelink relay UE.

Based on analysis, the inventor found that merely the UE-network relay scenario is considered in the existing techniques. In the scenario, quality of a channel between the relay and the base station is relatively high, and even if the channel quality degrades, other base stations (eNBs) may be found through handover to provide a reliable Uu link for the relay. In the scenario, a remote UE merely needs to pay attention to the channel between itself and the relay when performing relay selection or reselection.

However, in a UE-to-UE relay scenario, channels between the two UEs and the relay need to be taken into consideration for relay selection or reselection, which has been neglected in the existing techniques.

In embodiments of the present disclosure, a relay selection method for a sidelink is provided, wherein the sidelink is a communication link between a first terminal and a second terminal, and the method includes: receiving a first message, wherein the first message includes a first candidate relay set including at least one first candidate relay, quality of a first link between the first terminal and the at least one first candidate relay reaches a preset threshold; selecting a preferred relay from the first candidate relay set based on quality of a second link between the second terminal and the at least one first candidate relay in the first candidate relay set; and determining the preferred relay as a relay of the first terminal and the second terminal on the sidelink.

Embodiments of the present disclosureprovide relay selection logic suitable for UE-to-UE relay scenarios to ensure that two UEs that are communication peers in a sidelink can communicate with each other normally even when a communication distance is limited or channel quality is limited. Specifically, compared with the relay selection logic in existing techniques where merely quality of a channel between a UE performing relay selection and a relay is considered, solutions of the embodiments also take quality of a channel between a receptor UE and a relay into consideration for relay selection, thus, the finally selected preferred relay is more suitable for the UEs at both terminals that communicate via the sidelink.

In order to clarify the objects, characteristics and advantages of the disclosure, embodiments of present disclosure will be described in detail in conjunction with accompanying drawings.

FIG. 1 is a flow chart of a relay selection method for a sidelink according to an embodiment.

The method may be applied to a UE-to-UE relay scenario. A relay is provided between UEs that perform data communication via a sidelink to realize message relay, thereby increasing a communication distance between the UEs and improving communication quality.

The method may be applied at a UE side, for example, performed by a UE.

The sidelink may be a communication link between a first terminal and a second terminal, wherein one of the first terminal and the second terminal is a Transmit Sidelink UE (Tx-UE), and the other of the first terminal and the second terminal is a Received Sidelink UE (Rx-UE).

The Tx-UE may be a data sender among the two terminals communicating via the sidelink, and correspondingly, the Rx-UE may be a data receiver among the two terminals.

The Rx-UE may be a terminal that monitors link quality among the two terminals communicating via the sidelink. More details of the Tx-UE and Rx-UE may be referred to relevant provisions in existing or future standards.

The method may be performed by the Rx-UE or the Tx-UE. That is, the method may be performed by one of the two terminals communicating via the sidelink.

In the following embodiments, the second terminal is taken as the terminal that performs the method. The second terminal may be an Rx-UE or a Tx-UE.

Referring to FIG. 1, the method may include S101, S102 and S103.

In S101, the second terminal receives a first message, wherein the first message includes a first candidate relay set including at least one first candidate relay, and quality of a first link between the first terminal and the at least one first candidate relay reaches a preset threshold.

In S102, the second terminal selects a preferred relay from the first candidate relay set based on quality of a second link between the second terminal and the at least one first candidate relay in the first candidate relay set.

In S103, the second terminal determines the preferred relay as a relay of the first terminal and the second terminal on the sidelink.

For facilitating expression, in the embodiments, quality of a link between the first terminal and any relay is denoted as quality of a first link, and quality of a link between the second terminal and any relay is denoted as quality of a second link. The quality of the link may also be referred to as quality of a channel.

In some embodiments, prior to S101, the method further includes: determining whether to trigger a relay selection operation based on quality of the sidelink.

Figure 2:
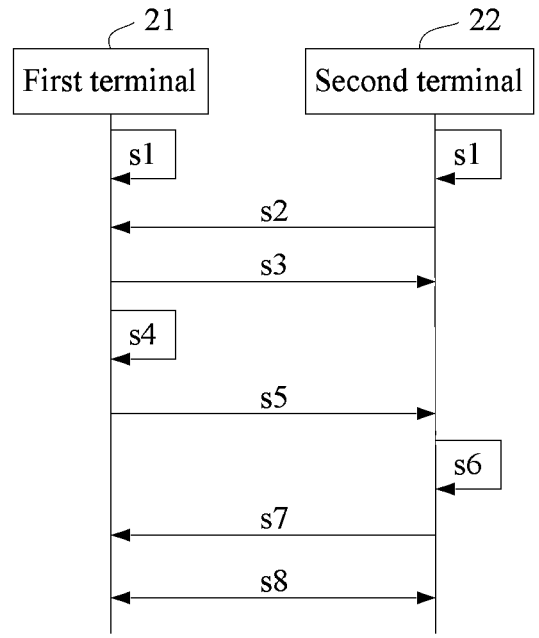
FIG. 2 is a signaling interaction diagram of an application scenario according to an embodiment.

For example, referring to FIG. 2, a pair of sidelink UEs (i.e., the first terminal and the second terminal) performs sidelink transmission. Both the first terminal 21 and the second terminal 22 may perform s1 to detect quality of the sidelink and determine whether to trigger the relay selection procedure in the embodiment.

In some embodiments, the quality of the link is determined based on corresponding channel state information which is at least selected from a group consisting of RSRP, RSSI, RSRQ, L1-SINR and CQI. In practice, those skilled in the art may measure other parameters that can reflect the quality of the link to monitor channel quality of the sidelink.

For example, measurement of the channel state information of the sidelink may be performed on one of following channels or RSs, but is not limited to the following channels or RSs: Physical Sidelink Shared Channel (PSSCH) or Demodulation Reference Signal (DMRS) of PSSCH; Physical Sidelink Discovery Channel (PSDCH) or DMRS of PSDCH; Sidelink Channel State Information-Reference Signal (S-CSI-RS); Physical Sidelink Control Channel (PSCCH) or DMRS of PSCCH; Physical Sidelink Feedback Channel (PSFCH) or DMRS of PSFCH; Sidelink Synchronization Signal/Physical Broadcast Channel Block (SL-SSB), Sidelink Primary Synchronization Signal (S-PSS), Sidelink Secondary Synchronization Signal (S-SSS), Physical Sidelink Broadcast Channel (PSBCH) or DMRS of PSBCH, or Sidelink Phase-tracking Reference Signal (S-PTRS).

In some embodiments, the quality of the link may be obtained by measuring any one or more of the above parameters.

Further, based on the channel state information being lower than a preset trigger threshold, it is determined to trigger the relay selection operation. The preset trigger threshold may be configured via high-layer signaling, or may be pre-configured.

The high-layer signaling may be selected from a group consisting of Radio Resource Control (RRC), System Information Block (SIB), and Media Access Control-Control Element (MAC-CE).

Accordingly, during the relay selection procedure in the embodiment, the quality of the first link is obtained by measuring the channel state information of the link between the first terminal and the relay, and the quality of the second link is obtained by measuring the channel state information of the link between the second terminal and the relay.

Further, different sidelinks may correspond to different preset trigger thresholds or a same preset trigger threshold. The preset trigger threshold may be configured via high-layer signaling by a base station or pre-configured.

In some embodiments, the sidelink between the first terminal and the second terminal may be bidirectional. Therefore, based on a measurement result of one of the first terminal and the second terminal indicating that the quality of the link between the first and second terminals is lower than the preset trigger threshold, it is determined to trigger the relay selection operation.

Alternatively, it is determined to trigger the relay selection operation based on the quality of the bidirectional links of the first and second terminals being both lower than the preset trigger threshold.

Alternatively, one of the first terminal and the second terminal, which serves as the Tx-UE may receive CQI report or RSRP report from the other terminal which serves as the Rx-UE. If the CQI or RSRP is lower than the preset trigger threshold, the terminal serving as the Tx-UE may determine to trigger the relay selection or reselection.

Alternatively, one of the first terminal and the second terminal which serves as the Rx-UE may determine whether to trigger the relay selection or reselection based on measured CQI or RSRP. If the CQI or RSRP is lower than the preset trigger threshold, the terminal serving as the Rx-UE may determine to trigger the relay selection.

Alternatively, another parameter (hysteresis, hereinafter referred to as a preset adjustment amount) may also be configured. Based on the quality of the link being lower than a value obtained by subtracting the hysteresis from the preset trigger threshold, it is determined to trigger the relay selection or reselection. In some embodiments, the preset adjustment amount may be used to better avoid the ping-pong effect.

In some embodiments, the first terminal and the second terminal may report the channel state information obtained by measurement to the base station, and the base station performs the trigger determination. Accordingly, prior to S101, the method may further include: receiving a start instruction which is used for triggering the relay selection operation. The start instruction may be sent by the base station.

In some embodiments, the start instruction may be sent to the first terminal and the second terminal respectively via high-layer signaling or Sidelink Control Information (SCI), so that the first terminal and the second terminal go to the relay selection procedure immediately.

Alternatively, the start instruction may be sent merely to the first terminal or the second terminal, and the terminal that receives the start instruction notifies the other terminal to go to the relay selection procedure via high-layer signaling or SCI. In some embodiments, the terminal that receives the start instruction may be the terminal currently serving as the Rx-UE among the first and second terminals.

In some embodiments, the base station may instruct the first terminal and/or the second terminal to perform relay selection or reselection via high-layer signaling or Downlink Control Information (DCI).

In some embodiments, the base station may instruct the first terminal and/or the second terminal to terminate the relay operation via high-layer signaling or DCI, i.e., instruct that the first terminal and/or the second terminal cannot communicate using the relay.

In some embodiments, the first terminal may instruct the second terminal to perform relay selection or reselection via high-layer signaling or SCI.

Alternatively, based on the relay selection is triggered by an instruction from the base station, s1 may be omitted.

In some embodiments, when the first terminal does not need to continue relay services, the first terminal may instruct via high-layer signaling or SCI the second terminal and/or the relay and/or the base station to terminate the relay, i.e., indicate that the first and second terminals cannot or need not continue to use the relay for communication. In some embodiments, after receiving the high-layer signaling or the SCI from the first terminal, the relay or the base station may notify the second terminal via high-layer signaling or SCI that the relay cannot be used or isn't needed for communication.

In some embodiments, the first terminal may instruct the second terminal to terminate the relay operation via high-layer signaling or SCI, i.e., instruct the second terminal that the relay cannot be used for communication. In some embodiments, prior to S101, the method further includes: transmitting a second message which is used for requesting to obtain the first candidate relay set.

Still referring to FIG. 2, assuming that the second terminal 22 performs s1 to determine to trigger the relay selection, the second terminal 22 may perform s2 to send the second message to the first terminal 21, thereby instructing the first terminal 21 to go to the relay selection procedure.

Further, the second message may be carried by high-layer signaling, such as RRC, SIB or MAC-CE.

Alternatively, the second message may be carried by dynamic indication, such as SCI.

Alternatively, based on the relay selection procedure being triggered in response to a start instruction of the base station, s2 may be omitted.

In some embodiments, the second message is further used for indicating a number of the at least one first candidate relay included in the first candidate relay set.

In some embodiments, following transmitting the second message and prior to S101, the method further includes: receiving a third message which includes acknowledgement feedback information of the second message.

Still referring to FIG. 2, in response to receiving the second message, the first terminal 21 may determine that a relay needs to be set up on the sidelink between the first and second terminals.

Accordingly, the first terminal 21 may perform s3 to send the third message to the second terminal 22.

Further, the third message may be carried by PSCCH or PSSCH. Similar to the second message, the third message may also be carried by high-layer signaling or dynamic indication. For example, the dynamic indication may include control information indication.

Alternatively, s3 may be omitted, and following sending the second message, the second terminal 22 may immediately perform measurement on surrounding relays to obtain the second candidate relay set. Further, in response to receiving the second message, the first terminal 21 may immediately perform s4.

Still referring to FIG. 2, in some embodiments, in response to receiving the second message, the first terminal 21 may perform s4 to measure the quality of the first link between the first terminal 21 and possible surrounding relays.

For example, the first terminal 21 may measure quality of the channels between the possible surrounding relays and the first terminal 21.

Specifically, the first terminal 21 may determine the quality of the first link based on the channel state information of the links between the first terminal 21 and the possible surrounding relays.

Alternatively, s3 and s4 may be performed synchronously or asynchronously. Alternatively, s3 may be omitted.

Still referring to FIG. 2, in some embodiments, the first terminal 21 may determine qualified relays among the possible surrounding relays as candidate relays to form the first candidate relay set, and perform s5 to send the first candidate relay set to the second terminal 22 via the first message. s5 can be considered as a step corresponding to S101.

Similar to the second message, the first message may also be carried by high-layer signaling or dynamic indication.

In some embodiments, quality of the first link between the first terminal 21 and the qualified relays reaches the preset threshold which may be determined based on the preset trigger threshold.

For example, the first terminal 21 may measure an RSRP of a reference signal or a channel sent by a surrounding relay, and determine that the relay meets a condition based on the measured RSRP being greater than the preset trigger threshold.

For another example, the first terminal 21 may measure an RSRP of a reference signal or a channel sent by a surrounding relay, and determine that the relay meets the condition based on the measured RSRP being greater than a sum of the preset trigger threshold and the preset adjustment amount (hysteresis). Alternatively, the first terminal 21 may measure other channel state information sent by a surrounding relay to determine whether the relay meets the condition.

Further, the preset adjustment amount may be configured via high-layer signaling or pre-configured.

Further, the quality of the link may be measured based on channel state information.

In some embodiments, the first candidate relay set may include all qualified relays obtained by measurement of the first terminal.

Alternatively, based on the second message further indicating a number n of the candidate relays included in the first candidate relay set, the first terminal may select n relays with highest quality of the first link from all the qualified relays obtained by measurement to form the first candidate relay set.

For example, the number n indicated in the second message is 4. Accordingly, the first candidate relay set may include 4 relays with largest RSRP.

Alternatively, the number n may be used to indicate n candidate relays that need to be fed back by the first terminal and meet specific requirements, or n candidate relays with highest channel quality, or any n candidate relays among the surrounding relays obtained by measurement.

Alternatively, the number n may be indicated by the base station to the first terminal and/or the second terminal via high-layer signaling or SCI.

Alternatively, the number n may be preconfigured.

Alternatively, the first candidate relay set may merely include the relay with the highest quality of the first link among all the qualified relays obtained by measurement.

Alternatively, the first candidate relay set may include all the qualified relays obtained by measurement, regardless of whether the quality of the first link of the relays satisfies the condition.

Alternatively, the first candidate relay set may be autonomously determined by the first terminal.

Further, the first candidate relay set may include an Identification (ID) of each candidate relay, and/or the quality of the first link of each candidate relay. Specifically, this information can be carried by PSSCH.

Figure 3:
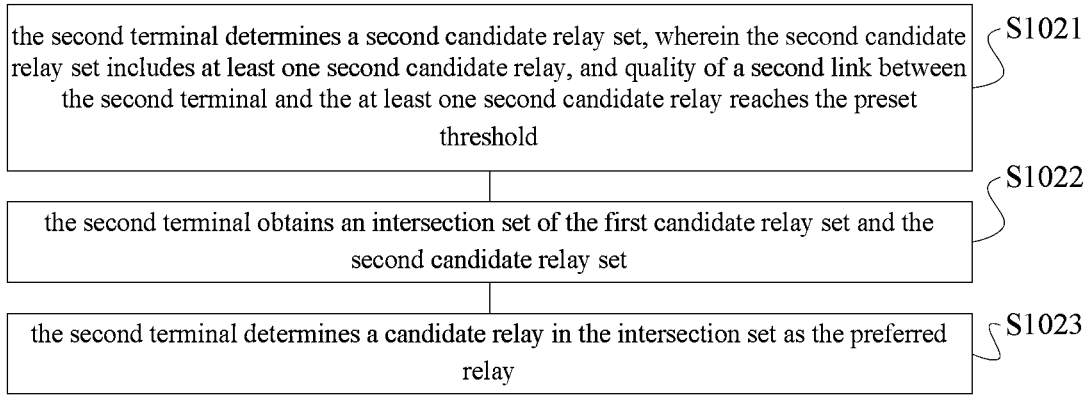
FIG. 3 is a flow chart of S102 as shown in FIG. 1 according to an embodiment.

Alternatively, one or more of steps as shown in FIG. 2 may be omitted. Referring to FIG. 3, in some embodiments, S102 may include S1021, S1022 and S1023.

In S1021, the second terminal determines a second candidate relay set, wherein the second candidate relay set includes at least one second candidate relay, and quality of a second link between the second terminal and the at least one second candidate relay reaches the preset threshold.

In S1022, the second terminal obtains an intersection set of the first candidate relay set and the second candidate relay set.

In S1023, the second terminal determines a candidate relay in the intersection set as the preferred relay.

Therefore, the channel quality of the UEs at both terminals that realize data transmission via the relay is taken into consideration for the relay selection, which enables the finally selected preferred relay to be more suitable for the UEs at both terminals that communicate via the sidelink.

For example, still referring to FIG. 2, in response to receiving the first message, the second terminal 22 may perform s6 to determine the second candidate relay set and select the preferred relay from an intersection set of the second candidate relay set and the first candidate relay set.

Specifically, in S1021, similar to s4, the second terminal 22 may also measure quality of the second link between the second terminal 22 and possible surrounding relays.

For example, the second terminal 22 may measure an RSRP of reference signals or channels sent by possible surrounding relays, and select the relays whose RSRPs meet a condition into the second candidate relay set.

Details of qualified relays may be referred to the above-mentioned relevant descriptions about the first candidate relay set, and are not described in detail here.

In some embodiments, the preset trigger threshold for determining whether a relay can be selected into the first candidate relay set may be the same as or different from the preset trigger threshold for determining whether a relay can be selected into the second candidate relay set. The preset adjustment amount the preset trigger threshold for determining whether a relay can be selected into the first candidate relay set may be the same as or different from the preset adjustment amount for determining whether a relay can be selected into the second candidate relay set.

In some embodiments, the second candidate relay set may include all qualified relays obtained by measurement of the second terminal.

Alternatively, a number of relays included in the second candidate relay set may be equal to a number indicated by the second terminal in the second message.

Alternatively, the second candidate relay set may merely include the relay with the highest quality of the second link among all the qualified relays obtained by measurement.

Alternatively, the second candidate relay set may include all the qualified relays obtained by measurement, regardless of whether the quality of the second link of the relays satisfies the condition.

Alternatively, a number of relays included in the second candidate relay set may be configured via high-layer signaling by the base station or pre-configured.

Further, the second candidate relay set may include an ID of each candidate relay, and further the quality of the second link of each candidate relay.

Further, in S1022, by comparing the IDs of the candidate relays, the intersection set of the first candidate relay set and the second candidate relay set may be obtained, that is, the candidate relays that are in both the first candidate relay set and the second candidate relay set are determined. The intersection set may be denoted as a third candidate relay set.

Alternatively, if the first candidate relay set and the second candidate relay set do not have an intersection, the second terminal may resend the second message to the first terminal to redo the relay selection.

Alternatively, the second terminal may consider that there is currently no suitable relay available for service, and thus directly terminate the relay selection operation. Alternatively, the second terminal may notify the base station via high-layer signaling that no suitable relay has been found for service.

In some embodiments, in S1023, based on the third candidate relay set including merely one candidate relay, the candidate relay may be determined as the preferred relay.

In some embodiments, based on the intersection set including a plurality of candidate relays, that is, the third candidate relay set including a plurality of candidate relays, the second terminal may select one candidate relay from the third candidate relay set as the preferred relay.

In some embodiments, the second terminal may randomly select one candidate relay from the third candidate relay set as the preferred relay which is a serving relay of the sidelink.

In some embodiments, a candidate relay corresponding to $\max_i \min\{RSRPi\text{-}1, RSRPi\text{-}2\}$ may be selected from the third candidate relay set as the preferred relay, where $\max_i \min\{A_i, B_i\}$ includes selecting minimum values from $A_i$ and $B_i$ and determining $A_i$ or $B_i$ corresponding to a largest value among all the minimum values, RSRPi-1 is the quality of the first link between the ith candidate relay and the first terminal, RSRPi-2 is the quality of the second link between the ith candidate relay and the second terminal.

That is, for each candidate relay in the third candidate relay set, a minimum value among the quality of the first link and the quality of the second link of the candidate relay is determined as a selection criterion. The candidate relay with a maximum value among the minimum values of all the candidate relays is determined as the preferred relay. For example, assume that the third candidate relay set includes {relay-1, relay-2}, where the quality RSRP1-1 of the first link between the first candidate relay (relay-1) and the first terminal is 3, the quality RSRP1-2 of the second link between the first candidate relay (relay-1) and the second terminal is 5, the quality RSRP2-1 of the first link between the second candidate relay (relay-2) and the first terminal is 2, and the quality RSRP2-2 of the second link between the second candidate relay (relay-2) and the second terminal is 7. In this case, $\min\{RSRP1\text{-}1, RSRP1\text{-}2\}=3$, $\min\{RSRP2\text{-}1, RSRP2\text{-}2\}=2$, and based on the $\max_i \min\{\ \}$ criterion, relay-1 should be selected as the preferred relay.

Alternatively, parameters in the $\max_i \min\{\ \}$ function may be replaced with other parameters capable of measuring the quality of the link.

Figure 4:
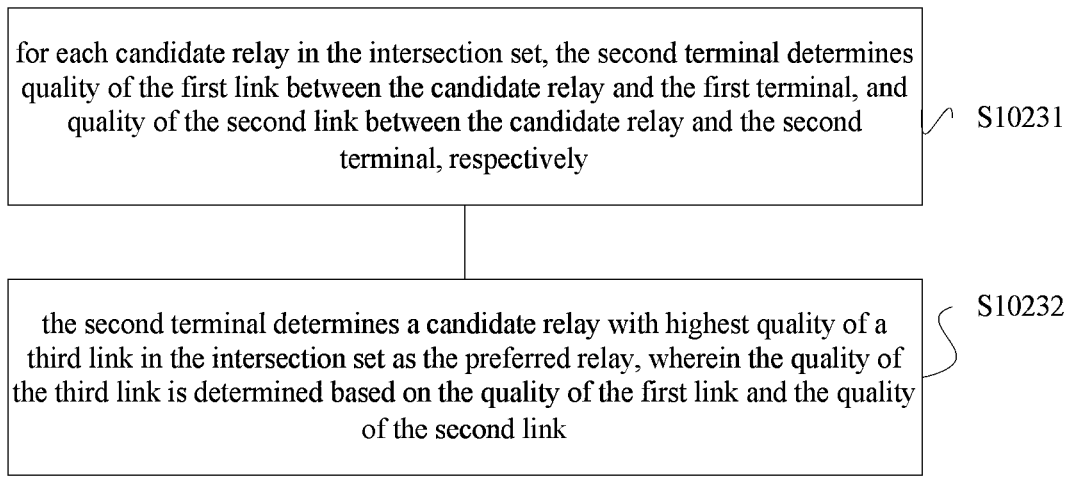
FIG. 4 is a flow chart of S1023 as shown in FIG. 3 according to an embodiment.

Referring to FIG. 4, in some embodiments, S1023 may include S10231 and S10232.

In S10231, for each candidate relay in the intersection set, the second terminal determines quality of the first link between the candidate relay and the first terminal, and quality of the second link between the candidate relay and the second terminal, respectively.

In S10232, the second terminal determines a candidate relay with highest quality of a third link in the intersection set as the preferred relay, wherein the quality of the third link is determined based on the quality of the first link and the quality of the second link.

In some embodiments, the quality of the third link may be a result of an arithmetic operation of the quality of the first link and the quality of the second link.

For example, for each candidate relay, the quality of the third link may be a sum of the quality of the first link and the quality of the second link in the third candidate relay set.

For another example, for each candidate relay, the quality of the third link may be a product of the quality of the first link and the quality of the second link in the third candidate relay set.

In some embodiments, S1021 may be performed prior to or following or simultaneously with s4 as shown in FIG. 2.

The embodiments as shown in FIGS. 3 and 4 may be applied to a scenario where the first terminal and the second terminal do not monitor the quality of the link for surrounding relays in real time.

Figure 5:
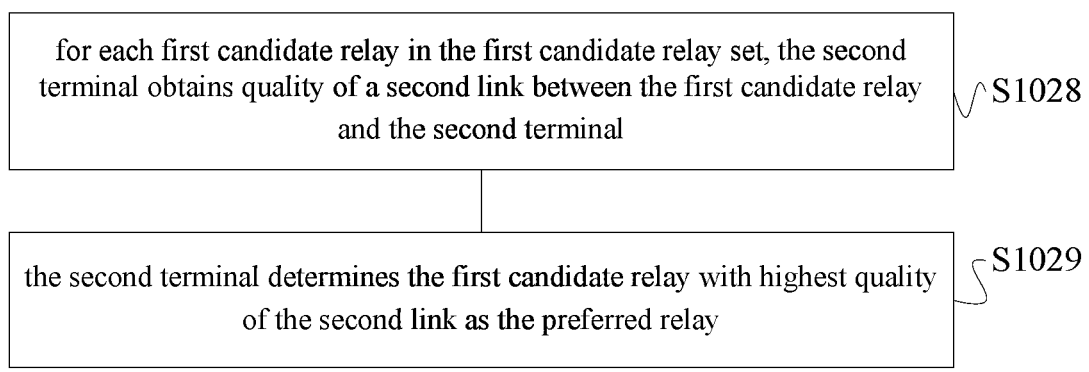
FIG. 5 is a flow chart of S102 as shown in FIG. 1 according to an embodiment.

In some embodiments, referring to FIG. 5, S102 may include S1028 and S1029.

In S1028, for each first candidate relay in the first candidate relay set, the second terminal obtains quality of a second link between the first candidate relay and the second terminal.

In S1029, the second terminal determines the first candidate relay with highest quality of the second link as the preferred relay.

Differences from the embodiments as shown in FIGS. 3 and 4 lie in that in the embodiment, the second terminal may not perform any operation prior to receiving the first message, and directly selecting a suitable candidate relay from the first candidate relay set as a serving relay following receiving the first message.

Alternatively, the candidate relays in the first candidate relay set may be arranged in a descending order of the quality of the first link.

In response to receiving the first message, the second terminal may measure the quality of the second link between the second terminal and each candidate relay in sequence, starting from the candidate relay ranked first. Based on the quality of the second link between the second terminal and a candidate relay minus the preset adjustment amount being greater than the preset trigger threshold, the candidate relay may be determined as the preferred relay.

The embodiment as shown in FIG. 5 may be applied to a scenario where the first terminal and the second terminal monitor the quality of the link of the surrounding relays in real time.

In some embodiments, following S102, the method in the embodiment may further include: transmitting a fourth message which includes the preferred relay.

For example, the fourth message may include an ID of the preferred relay.

For example, still referring to FIG. 2, following s6, the second terminal 22 may further perform s7 to send the fourth message to the first terminal 21.

In some embodiments, following S102, the method in the embodiment may further include: reselecting a relay based on the quality of the first link between the first terminal and the preferred relay being lower than the preset threshold, and/or based on the quality of the second link between the second terminal and the preferred relay being lower than the preset threshold.

For example, still referring to FIG. 2, following s7, after selecting the preferred relay and perform sidelink communication based on the preferred relay, both the first terminal 21 and the second terminal 22 measure the quality of the link between themselves and the preferred relay.

Based on any one of the first terminal 21 and the second terminal 22 finding that the quality of the link between itself and the preferred relay is lower than the preset threshold, it is determined that the preferred relay is no longer suitable for the sidelink, and s8 is performed to trigger the peer to perform relay reselection.

Alternatively, based on both the first terminal 21 and the second terminal 22 finding that the quality of the link between themselves and the preferred relay is lower than the preset threshold, it is determined that the preferred relay is no longer suitable for the sidelink, and s8 is performed to trigger the peer to perform relay reselection.

In some embodiments, based on the quality of the first link being lower than the preset trigger threshold minus the preset adjustment amount, it is determined that relay reselection is needed. Alternatively, based on the quality of the first link being lower than the preset trigger threshold, it is determined that relay reselection is needed.

In some embodiments, based on the quality of the second link being lower than the preset trigger threshold minus the preset adjustment amount, it is determined that relay reselection is needed. Alternatively, based on the quality of the second link being lower than the preset trigger threshold, it is determined that relay reselection is needed.

In some embodiments, based on the quality of the first link being lower than the preset trigger threshold minus the preset adjustment amount, and the quality of the second link being lower than the preset trigger threshold minus the preset adjustment amount, it is determined that relay reselection is needed. Alternatively, based on the quality of the first link being lower than the preset trigger threshold, and the quality of the second link being lower than the preset trigger threshold, it is determined that relay reselection is needed.

Further, details of the relay reselection may be referred to specific description of the relay selection in the embodiment, and a significant difference between the relay reselection and the relay selection lies in a trigger timing.

It should be noted that, in the embodiment, a threshold determination condition for triggering the relay selection or relay reselection may be include the quality of the link being lower than the preset trigger threshold, or the quality of the link being lower than the preset trigger threshold minus the preset adjustment amount (hysteresis).

A criterion for determining that the relay meets the condition may include the quality of the link being higher than the preset trigger threshold, or the quality of the link being higher than the preset trigger threshold plus the preset adjustment amount (hysteresis).

From above, embodiments of the present disclosure provide relay selection logic suitable for UE-to-UE relay scenarios to ensure that two UEs that are communication peers in a sidelink can communicate with each other normally even when a communication distance is limited or channel quality is limited. Specifically, compared with the relay selection logic in existing techniques where merely quality of a channel between a UE performing relay selection and a relay is considered, solutions of the embodiments also take quality of a channel between a receptor UE and a relay into consideration for relay selection, thus, the finally selected preferred relay is more suitable for the UEs at both terminals that communicate via the sidelink.

Alternatively, based on the first terminal or the second terminal determining that a relay is not needed for service in subsequent communication, the first terminal or the second terminal may send a request of suspending the relay service to the relay or base station. The request may be carried by high-layer signaling.

Figure 6:
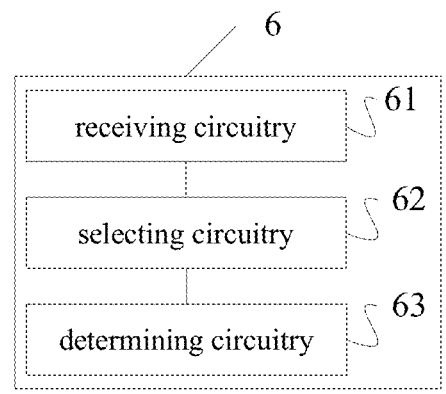
FIG. 6 is a structural diagram of a relay selection device for a sidelink according to an embodiment.

FIG. 6 is a structural diagram of a relay selection device for a sidelink according to an embodiment. Those skilled in the art could understand that the relay selection device 6 for the sidelink (referred to as the relay selection device 6 hereinafter) may be used to perform the method as shown in FIGS. 1 to 5.

In some embodiments, the sidelink is a communication link between a first terminal and a second terminal.

Referring to FIG. 6, the relay selection device 6 includes: a receiving circuitry 61 configured to receive a first message, wherein the first message includes a first candidate relay set including at least one first candidate relay, quality of a first link between the first terminal and the at least one first candidate relay reaches a preset threshold; a selecting circuitry 62 configured to select a preferred relay from the first candidate relay set based on quality of a second link between the second terminal and the at least one first candidate relay in the first candidate relay set; and a determining circuitry 63 configured to determine the preferred relay as a relay of the first terminal and the second terminal on the sidelink.

More details of working principles and working modes of the relay selection device 6 can be found in the above descriptions of FIGS. 1 to 5, and are not described here.

In an embodiment of the present disclosure, a storage medium having computer instructions stored therein is provided, wherein when the computer instructions are executed, the method as shown in FIGS. 1 to 5 is performed. In some embodiments, the storage medium may be a computer readable storage medium, such as a non-volatile memory or a non-transitory memory. The storage medium may include a Read Only Memory (ROM), a Random Access Memory (RAM), a magnetic disk or an optical disk.

In an embodiment of the present disclosure, a terminal including a memory and a processor is provided, wherein the memory has computer instructions stored therein, and when the processor executes the computer instructions, the method as shown in FIGS. 1 to 5 is performed. In some embodiments, the terminal may be a 5G UE.

Figure 7:
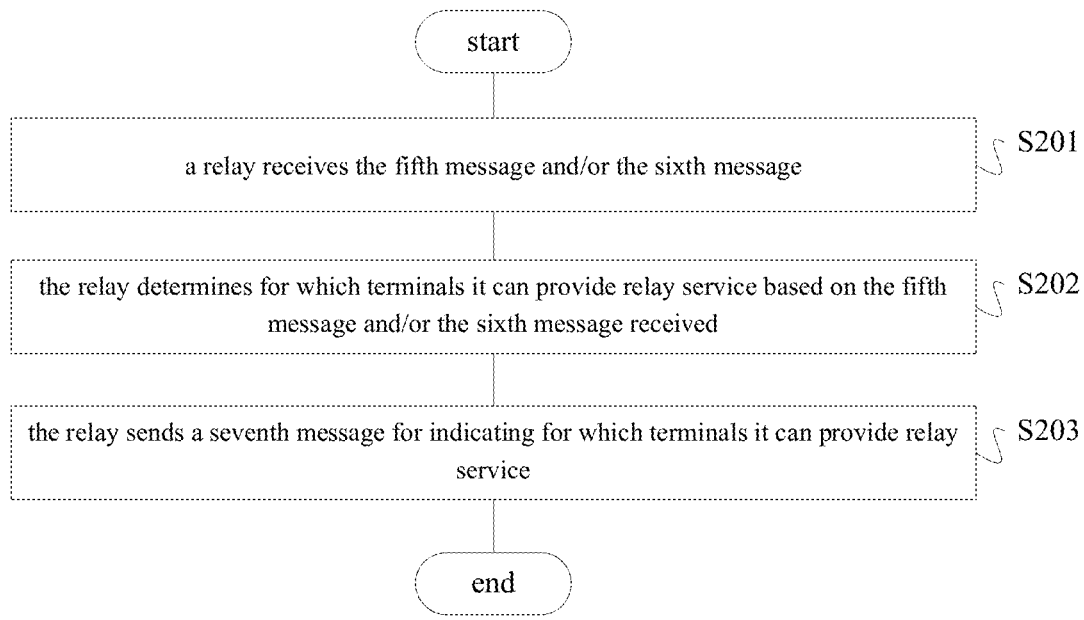
FIG. 7 is a flow chart of a relay selection method for a sidelink according to an embodiment.

FIG. 7 is a flow chart of a relay selection method for a sidelink according to an embodiment.

In the embodiment as shown in FIG. 7, a fifth message is sent by a first terminal, a sixth message is sent by a second terminal, a fourth link refers to a link between a relay and the first terminal, and a fifth link refers to a link between the relay and the second terminal.

Specifically, referring to FIG. 7, the method in the embodiment may include S201 of receiving the fifth message and/or the sixth message.

The fifth message may include terminal information of quality of the fourth link reaching a preset threshold, and the sixth message may include terminal information of quality of the fifth link reaching the preset threshold.

For example, the relay may receive the fifth message from the first terminal. Accordingly, the first terminal may determine whether to perform sidelink communication via the relay.

For another example, the relay may receive the sixth message from the second terminal. Accordingly, the second terminal may determine whether to perform sidelink communication via the relay.

For another example, the relay may respectively receive the fifth message from the first terminal and the sixth message from the second terminal. The terminal performing the method in the embodiment may determine whether it can provide a relay service for the sidelink between the first terminal and the second terminal based on the fifth message and the sixth message.

Further, the fifth message may further include terminal information of other terminals whose quality of the link with the relay reaches the preset threshold. Similarly, the sixth message may further include terminal information of other terminals whose quality of the link with the relay reaches the preset threshold.

In some embodiments, the fifth message or the sixth message may include at least one of following information: ID of the first terminal, ID of the second terminal, ID of the first terminal and ID of the second terminal, channel state information of the fourth link, channel state information of the fifth link, and ID of the relay, wherein the ID of the first terminal may identify or uniquely identify the first terminal, the ID of the second terminal may identify or uniquely identify the second terminal, and the ID of the relay may identify or uniquely identify the relay. Multiple relay IDs may be included.

A number of the relay IDs may be configured by the base station via high-layer signaling, or determined by the first terminal or the second terminal, or pre-configured.

In some embodiments, for the relay in the fifth message, the channel state information of the fourth link should be greater than a threshold.

For example, for the relay in the fifth message, RSRP, RSSI, RSRQ, CQI or L1-SINR of a channel of the corresponding fourth link should be greater than a threshold which may be configured via high-layer signaling by the base station or pre-configured.

In some embodiments, for the relay in the sixth message, the channel state information of the fifth link should be greater than a threshold.

For example, for the relay in the sixth message, RSRP, RSSI or RSRQ of a channel of the corresponding fifth link should be greater than a threshold which may be configured via high-layer signaling by the base station or pre-configured.

Still referring to FIG. 7, the method in the embodiment may further include S202 of the relay determining for which terminals it can provide relay service based on the fifth message and/or the sixth message received.

In some embodiments, based on the channel state information of the first terminal and/or the second terminal obtained in the fifth message and/or the sixth message, if the quality of the link between the relay and the first terminal and the quality of the link between the relay and the second terminal meet requirements on channel quality, the relay determines that it can provide relay service for the first terminal and the second terminal.

Alternatively, if there are multiple first terminals and second terminals that meet the requirements on channel quality, the relay may determine for which group or groups of first terminal and second terminal it provide the relay service.

Alternatively, if there are multiple first terminals and second terminals that meet the requirements on channel quality, the relay may select the group corresponding to $\max_i \min\{RSRPi\text{-}1, RSRPi\text{-}2\}$ from the groups of first terminal and second terminal to provide the relay service, where RSRPi-1 is the quality of the link between the ith first terminal and the relay, and RSRPi-2 is the quality of the link between the ith second terminal and the relay.

Alternatively, if there are multiple first terminals and second terminals that meet the requirements on channel quality, the relay may select the group with a maximum (RSRPi-1+RSRPi-2) from the groups of first terminal and second terminal to provide the relay service, where RSRPi-1 is the quality of the link between the ith first terminal and the relay, and RSRPi-2 is the quality of the link between the ith second terminal and the relay.

Alternatively, if there are multiple first terminals and second terminals that meet the requirements on channel quality, the relay may select the group with a maximum (RSRPi-1*RSRPi-2) from the groups of first terminal and second terminal to provide the relay service, where RSRPi-1 is the quality of the link between the ith first terminal and the relay, and RSRPi-2 is the quality of the link between the ith second terminal and the relay.

Alternatively, other parameters capable of measuring quality of the link, such as RSSI, CQI, L1-SINR or RSRQ, may also be selected as a selection basis.

Still referring to FIG. 7, the method in the embodiment may further include S203 of the relay sending a seventh message for indicating for which terminals it can provide relay service.

In some embodiments, the seventh message may include at least one of following information: ID of the first terminal, ID of the second terminal, ID of the first terminal and ID of the second terminal, and ID of the relay, wherein the ID of the delay may be the ID of the delay sending the seventh message.

Figure 8:
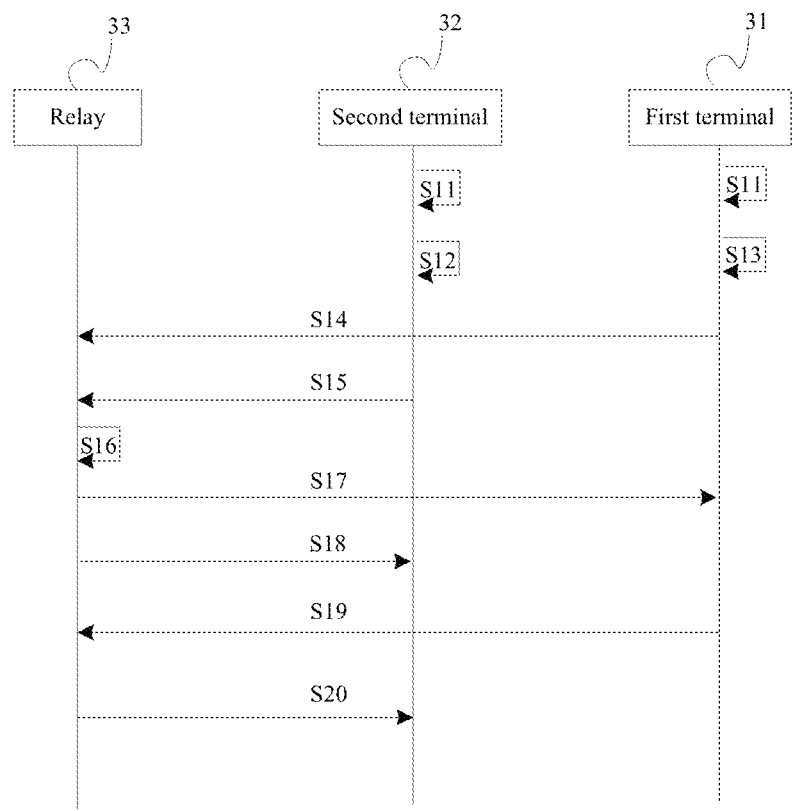
FIG. 8 is a signaling interaction diagram of an application scenario according to an embodiment.

Referring to FIG. 8, in an application scenario, a pair of sidelink UEs (i.e., the first terminal 31 and the second terminal 32) performs sidelink transmission. Both the first terminal 31 and the second terminal 32 may perform s11 to detect quality of the sidelink and determine whether to trigger the relay selection procedure in the embodiment.

Alternatively, the first terminal 31 needs to communicate with the second terminal 32 via the sidelink, but the first terminal 31 fails to detect the second terminal 32, and/or the second terminal 32 fails to detect the first terminal 31. Accordingly, the relay selection procedure is triggered.

The first terminal 31 may detect the second terminal 32 based on strength of a reference signal or a channel sent by the second terminal 32 and information carried by the reference signal or the channel.

Specifically, the reference signal or channel may be one of followings: sidelink SSB, sidelink PSS, sidelink SSS, sidelink PSBCH, DMRS of sidelink PSBCH, sidelink PSDCH, DMRS of sidelink PSDCH, sidelink PSSCH and/or PSCCH, DMRS of sidelink PSSCH and/or DMRS of sidelink PSCCH, sidelink CSI-RS, sidelink PSFCH, DMRS of sidelink PSFCH, and sidelink PTRS.

Alternatively, s11 may be omitted.

Further, the second terminal 32 may perform s12 to measure the quality of the link between the second terminal 32 and the relays, so as to determine which relays may be candidate relays.

In some embodiments, the second terminal 32 may measure quality of a channel (also referred to as quality of a link) between the second terminal 32 and the relay 33, i.e., the quality of the fifth link. The quality of the channel be obtained by measuring the reference signal or channel sent by the relay 33. Specifically, the reference signal or channel that may be sent by the relay 33 may include at least one of followings: sidelink SSB, sidelink PSS, sidelink SSS, sidelink PSBCH, DMRS of sidelink PSBCH, sidelink PSDCH, DMRS of sidelink PSDCH, sidelink PSSCH and/or PSCCH, DMRS of sidelink PSSCH and/or DMRS of sidelink PSCCH, sidelink CSI-RS, sidelink PSFCH, DMRS of sidelink PSFCH, and sidelink PTRS.

The second terminal 32 may measure RSRP, RSSI, RSRQ, CQI or L1-SINR of the channel of the fifth link. If the RSRP, RSSI, RSRQ, CQI or L1-SINR of the channel of the fifth link is greater than a threshold, the relay 33 corresponding to the fifth link is selected as a candidate relay and placed in a fourth set, which corresponds to s12. The fourth set includes information of relays whose corresponding fifth link meets the requirements on channel quality. In some embodiments, the UE may select the relay with highest channel quality in the fourth set as the final candidate relay, and store the corresponding relay information in the sixth message.

Similarly, the first terminal 31 may perform s13 to measure the quality of the link between the first terminal 31 and the relays, so as to determine which relays may be candidate relays.

After the relay selection or relay reselection is triggered, the first terminal 31 may perform s14 to transmit the fifth message.

Similarly, after the relay selection or relay reselection is triggered, the second terminal 32 may perform s15 to send the sixth message.

Alternatively, s12 and/or s15 may be omitted.

In s13, the first terminal 31 may measure the quality of the channel between the first terminal 31 and the relay 33, i.e., the channel quality of the fourth link. The channel quality may be obtained by measuring the reference signal or channel sent by the relay 33. Specifically, the reference signal or channel that may be sent by the relay 33 may include at least one of followings: sidelink SSB, sidelink PSS, sidelink SSS, sidelink PSBCH, DMRS of sidelink PSBCH, sidelink PSDCH, DMRS of sidelink PSDCH, sidelink PSSCH and/or PSCCH, DMRS of sidelink PSSCH and/or DMRS of sidelink PSCCH, sidelink CSI-RS, sidelink PSFCH, DMRS of sidelink PSFCH, and sidelink PTRS.

The first terminal 31 may measure RSRP, RSSI, RSRQ, CQI or L1-SINR of the channel of the fourth link. If the RSRP, RSSI, RSRQ, CQI or L1-SINR of the channel of the fourth link is greater than a threshold, the relay corresponding to the fourth link is selected as a candidate relay and placed in a fifth set, which corresponds to s13. The fifth set includes information of relays whose corresponding fourth link meets the requirements on channel quality. Alternatively, the UE may select the relay with highest channel quality in the fifth set as the final candidate relay, and store the corresponding relay information in the fifth message.

After the relay selection or relay reselection is triggered, the first terminal 31 may perform s14 to send the fifth message.

Alternatively, s13 and/or s14 may be omitted.

Further, in response to receiving the fifth message and/or the sixth message, the relay 33 may perform s16 of determining for which group of first terminal and second terminal it can provide relay service based on the fifth message and/or the sixth message received.

Further, the relay 33 may perform s17 and s18 to send the seventh message for indicating for which terminals the relay 33 can perform relay service.

In some embodiments, a target terminal of the seventh message may be the first terminal 31 or the second terminal 32, or the seventh message may be sent to both the first terminal 31 and the second terminal 32 respectively.

Further, in response to receiving the seventh message, the first terminal 31 and/or the second terminal 32 may feed back whether it correctly receives the seventh message.

For example, referring to FIG. 8, in response to receiving the seventh message, the first terminal 31 may perform s19 to send feedback information to the relay 33 for indicating that the seventh message is successfully received.

Further, in response to receiving the feedback information sent by the first terminal 31, the relay 33 may perform s20 to send an eighth message to the second terminal 32. The eighth message indicates for which terminals the relay 33 can perform relay service.

Alternatively, one or more of the operations as shown in FIG. 8 may be omitted.

A terminal in the embodiments of the present disclosure may refer to various forms of access terminal, user unit, user station, Mobile Station (MS), remote station, remote terminal, mobile equipment, user terminal, terminal equipment, wireless communication equipment, user agent or user device. The UE may further be a cellular phone, a cordless phone, a Session Initiation Protocol (SIP) phone, a Wireless Local Loop (WLL) station, a Personal Digital Assistant (PDA), a handheld device with a wireless communication function, a computing device or other processing devices connected to a wireless modems, an in-vehicle device, a wearable device, a terminal equipment in the future 5G network, or a terminal equipment in a future evolved Public Land Mobile Network (PLMN), which is not limited in the embodiments of the present disclosure.

It should be understood that the term "and/or" in the present disclosure is merely an association relationship describing associated objects, indicating that there can be three types of relationships, for example, A and/or B can represent "A exists only, both A and B exist, B exists only.

In addition, the character "/" in the present disclosure represents that the former and latter associated objects have an "or" relationship.

The "plurality" in the embodiments of the present disclosure refers to two or more.

The descriptions of the first, second, etc. in the embodiments of the present disclosure are merely for illustrating and differentiating the objects, and do not represent the order or the particular limitation of the number of devices in the embodiments of the present disclosure, which do not constitute any limitation to the embodiments of the present disclosure.

The "connection" in the embodiments of the present disclosure refers to various connection ways such as direct connection or indirect connection to realize communication between devices, which is not limited in the embodiments of the present disclosure.

The "network" and the "system" in the embodiments of the present disclosure refer to a same concept, that is, a communication system is equal to a communication network.

In the embodiments of the present disclosure, the processor may be a Central Processing Unit (CPU), or other general processors, Digital Signal Processors (DSPs), Application Specific Integrated Circuits (ASICs), Field Programmable Gate Arrays (FPGAs) or other Programmable logic devices, discrete gates or transistor logic devices, discrete hardware components, and the like. A general processor may be a microprocessor or the processor may be any conventional processor or the like.

It should also be understood that the memory in the embodiments of the present disclosure may be either volatile memory or nonvolatile memory, or may include both volatile and nonvolatile memories. The non-volatile memory may be a Read-Only Memory (ROM), a Programmable ROM (PROM), an Erasable PROM (EPROM), an electrically Erasable EPROM (EEPROM), or a flash memory. The volatile memory may be a Random Access Memory (RAM) which functions as an external cache. By way of example but not limitation, various forms of RAM are available, such as Static Random Access Memory (SRAM), Dynamic Random Access Memory (DRAM), Synchronous Dynamic Random Access Memory (SDRAM), Double Data Rate Synchronous Dynamic Random Access Memory (DDR SDRAM), Enhanced SDRAM (ESDRAM), Synchronous connection to DRAM (SLDRAM), and Direct Rambus RAM (DR-RAM).

The above embodiments may be implemented in whole or in part by software, hardware, firmware or any combination thereof. When implemented in software, the above embodiments may be implemented in whole or in part in the form of a computer program product. The computer program product includes one or more computer instructions or computer programs. The procedures or functions according to the embodiments of the present disclosure are wholly or partially generated when the computer instructions or the computer programs are loaded or executed on a computer. The computer may be a general purpose computer, a special purpose computer, a computer network, or other programmable device. The computer instructions may be stored in a computer readable storage medium or transmitted from one computer readable storage medium to another computer readable storage medium, for example, the computer instructions may be transmitted from one website, computer, server or data center to another website, computer, server or data center by wire (e.g., infrared, wireless, microwave and etc.). The computer readable storage medium may be any available medium that can be accessed by a computer or a data storage device such as a server or a data center that contains one or more sets of available media. The available medium may be a magnetic medium (e.g., floppy disk, hard disk or magnetic tape), an optical medium (e.g., DVD), or a semiconductor medium. The semiconductor medium may be a solid disk.

It should be understood that, in the various embodiments of the present disclosure, sequence numbers of the above-mentioned processes do not represent an execution sequence, and the execution sequence of each process should be determined by its function and inherent logic, which does not limit an implementation process of the embodiments of the present disclosure.

In the above embodiments of the present disclosure, it should be understood that the disclosed method, device and system may be implemented in other ways. For example, the above device embodiments are merely illustrative, and for example, division of units is merely one logical division, and other divisions may be realized in practice, for example, a plurality of units or components may be combined or integrated into another system, or some features may be omitted, or not executed. Further, the shown or discussed mutual coupling or direct coupling or communication connection may be an indirect coupling or communication connection via some interfaces, devices or units, and may be in an electrical, mechanical or other form.

The units described as separate parts may or may not be physically separate, and parts shown as units may or may not be physical units, that is, may be disposed in one place, or may be distributed on a plurality of network units. Some or all of the units can be selected according to practical requirements to achieve the purpose of the solutions of the embodiments.

In addition, functional units in the embodiments of the present disclosure may be integrated in one processing unit, or each unit may be physically separate, or two or more units may be integrated in one unit. The integrated units can be realized in a form of hardware, or in a form of hardware plus a software functional unit.

The integrated units implemented in the form of the software functional unit may be stored in a computer readable storage medium. The software functional unit is stored in a storage medium and includes several instructions for causing a computer device (a personal computer, a server or a network device) to execute some steps of the methods in the embodiments of the present disclosure. And the storage medium may be a medium for storing program codes, such as a U disk, a removable hard disk, a ROM, a RAM, a magnetic disk or an optical disk.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A relay selection method for a sidelink, wherein the sidelink is a communication link between a first terminal and a second terminal, and the method comprises:
    receiving a first message, wherein the first message comprises a first candidate relay set comprising at least one first candidate relay, and quality of a first link between the first terminal and the at least one first candidate relay reaches a preset threshold;
    selecting a preferred relay from the first candidate relay set based on quality of a second link between the second terminal and the at least one first candidate relay in the first candidate relay set; and
    determining the preferred relay as a relay of the first terminal and the second terminal on the sidelink;
    wherein said selecting the preferred relay from the first candidate relay set based on the quality of the second link between the second terminal and the at least one first candidate relay in the first candidate relay set comprises:
        arranging the at least one first candidate relay in the first candidate relay set in a descending order of the quality of the first link;
        from the first candidate relay with highest quality of the first link, measuring the quality of the second link between the second terminal and each first candidate relay in sequence; and
        based on the quality of the second link between the second terminal and the first candidate relay minus a preset adjustment amount being greater than a preset trigger threshold, determining the first candidate relay as the preferred relay.

2. The method according to claim 1, wherein prior to receiving the first message, the method further comprises:
    transmitting a second message which is used for requesting to obtain the first candidate relay set.

3. The method according to claim 2, wherein the second message is further used for indicating a number of the at least one first candidate relay included in the first candidate relay set.

4. The method according to claim 2, wherein following transmitting the second message and prior to receiving the first message, the method further comprises:
    receiving a third message which comprises acknowledgement feedback information of the second message.

5. The method according to claim 2, wherein the quality of the first link or the quality of the second link is determined based on corresponding channel state information which is at least selected from a group consisting of RSRP, RSSI, RSRQ, L1-SINR and CQI.

6. The method according to claim 1, further comprising:
    transmitting a fourth message which comprises the preferred relay.

7. The method according to claim 6, wherein the quality of the first link or the quality of the second link is determined based on corresponding channel state information which is at least selected from a group consisting of RSRP, RSSI, RSRQ, L1-SINR and CQI.

8. The method according to claim 1, wherein prior to receiving the first message, the method further comprises:
    determining whether to trigger a relay selection operation based on quality of the sidelink; or
    receiving a start instruction which is used for triggering the relay selection operation.

9. The method according to claim 8, wherein the quality of the first link or the quality of the second link is determined based on corresponding channel state information which is at least selected from a group consisting of RSRP, RSSI, RSRQ, L1-SINR and CQI.

10. The method according to claim 1, further comprising:
    reselecting a relay based on the quality of the first link between the first terminal and the preferred relay being lower than the preset threshold, and/or based on the quality of the second link between the second terminal and the preferred relay being lower than the preset threshold.

11. The method according to claim 10, wherein the quality of the first link or the quality of the second link is determined based on corresponding channel state information which is at least selected from a group consisting of RSRP, RSSI, RSRQ, L1-SINR and CQI.

12. The method according to claim 1, wherein the quality of the first link or the quality of the second link is determined based on corresponding channel state information which is at least selected from a group consisting of Reference Signal Received Power (RSRP), Received Signal Strength Indication (RSSI), Reference Signal Received Quality (RSRQ), Layer 1 Signal to Interference Plus Noise Ratio (L1-SINR) and Channel Quality Indication (CQI).

13. A non-transitory storage medium storing one or more programs, the one or more programs comprising computer instructions, which, when executed by a processor, cause the processor to:
   receive a first message, wherein the first message comprises a first candidate relay set comprising at least one first candidate relay, and quality of a first link between a first terminal and the at least one first candidate relay reaches a preset threshold;
   select a preferred relay from the first candidate relay set based on quality of a second link between a second terminal and the at least one first candidate relay in the first candidate relay set; and
   determine the preferred relay as a relay of the first terminal and the second terminal on a sidelink, wherein the sidelink is a communication link between the first terminal and the second terminal;
   wherein the processor is further caused to:
      arrange the at least one first candidate relay in the first candidate relay set in a descending order of the quality of the first link;
      from the first candidate relay with highest quality of the first link, measure the quality of the second link between the second terminal and each first candidate relay in sequence; and
      based on the quality of the second link between the second terminal and the first candidate relay minus a preset adjustment amount being greater than a preset trigger threshold, determine the first candidate relay as the preferred relay.

14. A terminal comprising a memory and a processor, wherein the memory has computer instructions stored therein, and when the processor executes the computer instructions, a relay selection method for a sidelink is performed, wherein the sidelink is a communication link between a first terminal and a second terminal, and the method comprises:
   receiving a first message, wherein the first message comprises a first candidate relay set comprising at least one first candidate relay, and quality of a first link between the first terminal and the at least one first candidate relay reaches a preset threshold;
   selecting a preferred relay from the first candidate relay set based on quality of a second link between the second terminal and the at least one first candidate relay in the first candidate relay set; and
   determining the preferred relay as a relay of the first terminal and the second terminal on the sidelink;
   wherein said selecting the preferred relay from the first candidate relay set based on the quality of the second link between the second terminal and the at least one first candidate relay in the first candidate relay set comprises:
      arranging the at least one first candidate relay in the first candidate relay set in a descending order of the quality of the first link;
      from the first candidate relay with highest quality of the first link, measuring the quality of the second link between the second terminal and each first candidate relay in sequence; and
      based on the quality of the second link between the second terminal and the first candidate relay minus a preset adjustment amount being greater than a preset trigger threshold, determining the first candidate relay as the preferred relay.

* * * * *